United States Patent [19]
Baresel et al.

[11] Patent Number: 4,972,811
[45] Date of Patent: Nov. 27, 1990

[54] IGNITION DEVICE WITH LOWERED IGNITION TEMPERATURE

[75] Inventors: Detlef Baresel, Stuttgart; Gerhard Huth; Anton Kling, both of Gerlingen, all of Fed. Rep. of Germany

[73] Assignee: Robert Bosch GmbH, Stuttgart, Fed. Rep. of Germany

[21] Appl. No.: 397,489

[22] PCT Filed: Dec. 4, 1987

[86] PCT No.: PCT/DE87/00572

§ 371 Date: Aug. 4, 1989

§ 102(e) Date: Aug. 4, 1989

[87] PCT Pub. No.: WO88/06680

PCT Pub. Date: Sep. 7, 1988

[30] Foreign Application Priority Data

Feb. 28, 1987 [DE] Fed. Rep. of Germany ....... 3706576

[51] Int. Cl.$^5$ .................. F02B 51/02; F02P 23/02
[52] U.S. Cl. ................ 123/143 B; 123/145 A; 123/169 EL; 123/670; 313/118
[58] Field of Search ............ 123/143 B, 169 EL, 668, 123/670, 145 A; 313/118, 130

[56] References Cited

U.S. PATENT DOCUMENTS

| 3,923,011 | 12/1975 | Pfefferle | 123/143 B X |
| 4,092,967 | 6/1978 | Haslett | 123/143 B |
| 4,389,983 | 6/1983 | Enga et al. | 123/143 B |
| 4,393,830 | 7/1983 | Bodine | 123/272 |
| 4,530,340 | 7/1985 | Totman | 123/670 X |

FOREIGN PATENT DOCUMENTS

| 144624 | 8/1983 | Japan | 123/670 |
| 150948 | 8/1984 | Japan . | |
| 216025 | 10/1985 | Japan | 123/143 B |

*Primary Examiner*—Tony M. Argenbright
*Attorney, Agent, or Firm*—Michael J. Striker

[57] ABSTRACT

An ignition system comprising one of a glow plug, spark plug and glow attachment having metal or ceramic surfaces which are exposed to a fuel/air mixtuer, and are at least partially covered with a coating comprising at least one complex metal oxide obtained as a result of a reaction of a basic oxide selected from a group comprising oxides of Si, Y, La and Ce and mixed oxides of the above-mentioned oxides with $Al_2O_3$, with at least one further oxide selected from a group comprising oxides of alkali and alkali earth metals.

3 Claims, No Drawings

IGNITION DEVICE WITH LOWERED IGNITION TEMPERATURE

BACKGROUND OF THE INVENTION

The invention relates to an ignition system, such as glow plugs, spark plugs or glow attachments. On their surface exposed to the fuel/air mixture, these ignition systems normally have a ceramic layer usually of alumina or metal. Usually, no particular attention is paid to the mechanism of the combustion, and the ignition temperatures are relatively high. However, the higher the ignition temperature, the shorter is the service life of the ignition systems. In addition, the higher the ignition temperature of the fuel/air mixture, the more difficult it is to obtain an exhaust gas which is as low in pollutants as possible.

SUMMARY OF THE INVENTION

The object of the invention is to provide an ignition system comprising a glow plug or the like and having an ignition temperature up to 100° C. below the ignition temperature which can be achieved with a conventional ignition device. The object of the invention is achieved by providing an ignition system comprising a glow plug or the like wherein a ceramic or metal surface of the glow plug exposed to a fuel/air mixture has a coating thereon including substances which catalyze the cracking process of hydrocarbons contained in a fuel.

Ignition systems are heated at exposed points by spark formation or heating to such an extent that the fuel/air mixture surrounding them burns more or less suddenly, for example in spark-ignition engines or diesel engines. In order to achieve the lowest ignition temperature possible, the primary ignition step must be accelerated which, in the case of hydrocarbons which are the main constituents of such fuels, consists in cracking of the hydrocarbons. The very greatly accelerated oxidation of the hydrocarbons, taking place in the form of an explosion, proceeds only afterwards due to free radicals formed as a results of the cracking process. It has now been found that the acceleration of this process of hydrocarbons can be achieved with catalysts which have the strongest possible Coulomb fields on their surface, withstand high temperatures of up to about 1,300° C., and are sufficiently active under operating conditions of a gasoline or diesel engine. The catalysts must therefore consist of inorganic substances with predominantly ionically bound lattice elements. This means that covalent bonding forces and/or an easy change of valency, tantamount to an easy exchangeability of p-, d- or f-electrons with the hydrocarbons and oxygen, should be reduced in these substances to the extent required.

It is particularly advantageous when the catalytic coating consists of a modified alumina which also contains silica, yttrium oxide, lanthanum oxide or cerium oxide as well as at least one further oxide from the group comprising the alkali metals or alkaline earth metals and furthermore, if appropriate, also at least one oxide of a d-transition metal, above all chromium oxide and/or nickel oxide.

In addition to the strongest possible Coulomb fields, already mentioned above, the materials used for the catalytic coating must withstand high temperatures of up to about 1,300° C. and have a sufficient activity under the operating conditions of a gasoline engine or diesel engine. They must therefore consist of inorganic substances with predominantly ionically bound lattice elements, as is the case for the abovementioned substances. Covalent bonding forces and/or an easy change of valency, that is to say an easy exchangeability of p-, d- or f-electrons with the hydrocarbons and oxygen, are probably reduced in these substances to the extent required. When d-metal oxides which, taken by themselves, represent oxidation catalysts, are added to the oxides of Al, Si, Y, La and Ce as base oxides, a reaction with a second d-metal oxide or another metal oxide can form new compounds, for example spinels, perowskites, pyrochlores or other complex metal oxides, which form catalytically oxidation inactive bonds and which likewise affect the combustion mechanism in such a way that the ignition temperature is reduced. These and further objects and advantages of the present invention will be best understood from the following detailed description thereof.

DESCRIPTION OF THE PREFERRED EMBODIMENTS

The coating of ceramic glow pin plugs or of spark plugs made of steel or silicon nitride ($Si_3N_4$), or of glow attachments, for example of platinum or steel, is carried out in such a way that a paste, prepared from a presintered metal oxide mixture and thick oil, is brushed onto the heatable head of a ceramic glow pin plug, as described in German Patent Specification No. 3,146,653, or onto the head of a glow plug of steel for diesel engines, or of a glow pin plug of silicon nitride and is sintered in. The metal oxide mixtures are obtained—except for $SiO_2$—from aqueous solutions of the metal salts and subsequent heat treatment. $SiO_2$ was suspended as a fine powder in the aqueous solution before the precipitation.

EXAMPLE 1:

24.15 g of $AlCl_3 . 6 H_2O$, 10.66 g of $CrCl_3 . 6 H_2O$ and 3.33 g of $MgCl_2$ were dissolved in 400 ml of $H_2O$ and the solution was heated to 80° C. Precipitation was then carried out by dropwise addition of half-concentrated $NH_4OH$ at pH=8. After the precipitation, the mixture was evaporated to dryness, and the residue was then heated during 5 hours to 500° C., in order to expel all the $NH_3$, $H_2O$ and $NH_4Cl$. The oxides were then ground wet in toluene for 24 hours, dried in air and in a vacuum drying cabinet at 90° C., and then treated with a commercially available thick oil, usual in thick-layer techniques, to produce a brushable paste. The paste is brushed onto the heatable head of a glow pin plug and burnt in for two hours at 1,300° C. The coating has a thickness of about 1,000 nm.

EXAMPLE 2:

24.15 g of $AlCl_3 . 6 H_2O$ and 3.33 g of $CaCl_2$ are dissolved in 400 ml of $H_2O$. 1.2 g of $SiO_2$ powder of a particle size of 100 to 1,000 nm are suspended in the solution. The further procedure is then as in Example 1.

EXAMPLE 3:

24.15 g of $AlCl_3 . 6 H_2O$ and 3.33 g of $CaCl_2$ are dissolved in 400 ml of $H_2O$. Precipitates are then produced from the solution with $NH_4OH$, and the procedure as described in Example 1 is followed up to the preparation of a paste. The paste is then brushed onto the head of a diesel engine glow plug, which consists, for example, of steel, and is sintered in air at 1,300° C. for 2 to 3 hours. The thickness of the coating was about 1,000 nm.

EXAMPLE 4:

The paste prepared according to Example 3 is brushed onto a glow pin plug of silicon nitride and sintered for 2 hours at 1,550° C. under an argon/hydrogen mixture or at 1,300° C. in air.

The results obtained with such coatings can be seen in the following table in which the ignition temperatures ($T_G$) of carburretor fuels on ceramic glow pin plugs at an air/fuel ratio lambda of 1.0 and 0.9 in a spark-ignition engine are listed.

TABLE

Ignition temperatures $T_G$ of coated and uncoated ceramic glow pin plugs at $\lambda = 1.0$ and $\lambda = 0.9$ in a gasoline engine (Briggs and Stratton) at 100% after ignition and, in the penultimate column, the average of the two; $\Delta T$ = respective reduction in ignition temperature

| Composition of the layer in mol % | $T_G$ [°C.] $\lambda = 1.0$ | $\lambda = 0.9$ | $1 > \lambda > 0.9$ | $\Delta T$ [°C.] |
|---|---|---|---|---|
| Without | 990 | 983 | 987 | |
| | | | | 12 |
| 0.4 $Al_2O_3$ + 0.2 $SiO_2$ + 0.2 CaO + 0.2 NiO | 960 | 989 | 975 | |
| | | | | 11 |
| 0.3 $Al_2O_3$ + 0.2 $SiO_2$ + 0.3 MgO + 0.2 $Cr_2O_3$ | 954 | 974 | 964 | |
| | | | | 33 |
| 0.5 $Al_2O_3$ + 0.3 MgO + 0.2 $Cr_2O_3$ | 929 | 933 | 931 | |
| | | | | 23 |
| 0.4 $Al_2O_3$ + 0.2 $SiO_2$ + 0.2 $Cr_2O_3$ + 0.2 NiO | 901 | 914 | 908 | |
| | | | | 0 |
| 0.8 $Al_2O_3$ + 0.1 MgO + 0.1 $Cr_2O_3$ | 891 | 924 | 908 | |
| | | | | 5 |
| 0.25 $Al_2O_3$ + 0.75 $SiO_2$ | 900 | 906 | 903 | |
| | | | | 3 |
| 0.9 $Al_2O_3$ + 0.1 $Cr_2O_3$ | 896 | 903 | 900 | |
| | | | | 15 |
| 0.5 $Al_2O_3$ + 0.2 $SiO_2$ + 0.3 CaO | 882 | 888 | 885 | |

It is seen that the ignition temperature of a gasoline-/air mixture can be lowered by up to 100° C. by providing according to the invention a coating which catalyses the cracking process of hydrocarbons. As it has already been emphasized above, this leads to a longer service life of the ignition system; furthermore, the polluting exhaust gas components can be minimized; and finally, it is also possible to lower the preheating temperature in a diesel engine. These and further objects and advantages of the present invention will be best understood from the following detailed description thereof.

While the invention has been illustrated and described as embodied in an ignition system for motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An ignition system comprising at least one of a glow plug, spark plug and glow attachment having surfaces which are formed of at least one of metal and ceramic and are exposed to a fuel/air mixture, said exposed surfaces being covered at least partially with a coating having an outer surface with a strong Coulomb field and comprising substances which catalyzes a cracking process of hydrocarbons contained in a fuel, said coating consisting of at least one metal oxide selected from a group including spinell, perowskite and pyrochlore which are obtained by a reaction of at least one base oxide selected from a group consisting of oxides of elements Si, Y, La and Ce and mixed oxides of the above-mentioned oxides with $Al_2O_3$, with at least one further oxide selected from a group consisting of elements Li, Na, K, Ca, Sr and Ba.

2. An ignition system as set forth in claim 1, wherein an oxide of elements Si, Y, La, Ce and $Al_2O_3$ contained in the coating as a base oxide, is contained therein in an amount of 40–99 mol %.

3. An ignition system as set forth in claim 1, wherein said coating has a thickness from 100 to 10,000 nm.

* * * * *